United States Patent
Nakai

(10) Patent No.: US 9,692,346 B2
(45) Date of Patent: Jun. 27, 2017

(54) CONTROL APPARATUS FOR ELECTRIC POWER INVERTER

(71) Applicant: DENSO CORPORATION, Kariya, Aichi-pref. (JP)

(72) Inventor: Yasuhiro Nakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/078,559

(22) Filed: Mar. 23, 2016

(65) Prior Publication Data

US 2016/0294317 A1    Oct. 6, 2016

(30) Foreign Application Priority Data

Mar. 30, 2015 (JP) .................................. 2015-067916

(51) Int. Cl.
| | | |
|---|---|---|
| H02P 21/00 | (2016.01) | |
| H02P 27/08 | (2006.01) | |
| H02P 21/22 | (2016.01) | |
| H02P 21/14 | (2016.01) | |

(52) U.S. Cl.
CPC .............. *H02P 27/08* (2013.01); *H02P 21/14* (2013.01); *H02P 21/22* (2016.02)

(58) Field of Classification Search
CPC ........... H02P 27/08; H02P 21/22; H02P 21/14
USPC ............ 318/400.02, 400.24, 400.25, 400.26, 318/400.01, 700, 801; 363/39, 40, 41, 363/21.01, 21.1, 21.02, 21.11
See application file for complete search history.

(56) References Cited

U.S. PATENT DOCUMENTS

| | | | | | |
|---|---|---|---|---|---|
| 5,614,803 | A | * | 3/1997 | Morioka | ........... H02M 7/53875 318/590 |
| 5,844,193 | A | * | 12/1998 | Nomura | ................. B23K 11/24 219/110 |
| 5,880,574 | A | * | 3/1999 | Otsuka | .................... B60L 3/003 318/139 |

(Continued)

FOREIGN PATENT DOCUMENTS

JP        3490600 B2    1/2004

OTHER PUBLICATIONS

Hava, Ahmet M. et al. "A High Performance Generalized Discontinuous PWM Algorithm" IEEE APEC; vol. 2, pp. 886-891, 1997.

*Primary Examiner* — Rita Leykin
(74) *Attorney, Agent, or Firm* — Oliff PLC

(57) ABSTRACT

An inverter control apparatus performs PWM control of a 3-phase inverter connected to a rotary machine, by operating switching devices corresponding to respective phases. In each of successive processing periods, the PWM control is applied such as to satisfy first and second conditions. The first condition is that the state of switching devices corresponding to a highest-voltage phase of the inverter during the processing period is held fixed throughout the processing period. The second condition is that switching devices corresponding to a lowest-voltage phase of the inverter undergoes a greater number of switching operations during the processing period than switching devices corresponding to an intermediate-voltage phase of the inverter. The frequency of harmonic components in AC currents flowing in the rotary machine can thereby be raised above the audible range, to suppress audible mechanical noise, without significantly increasing the amount of switching losses.

4 Claims, 14 Drawing Sheets

(56) References Cited

U.S. PATENT DOCUMENTS

| | | | | |
|---|---|---|---|---|
| 5,942,876 A * | 8/1999 | Maekawa | H02M 7/53875 | 318/778 |
| 5,949,664 A * | 9/1999 | Bernet | H02M 1/34 | 363/34 |
| 5,965,038 A * | 10/1999 | Nomura | B23K 11/24 | 219/110 |
| 6,839,249 B2 * | 1/2005 | Kalman | H02M 7/4826 | 363/35 |
| 7,075,267 B1 * | 7/2006 | Cheng | H02M 7/53875 | 318/432 |
| 7,308,192 B2 * | 12/2007 | Williams | H02M 7/5387 | 318/606 |
| 7,504,790 B2 * | 3/2009 | Tsuji | H02P 21/0089 | 318/432 |
| 7,746,039 B2 * | 6/2010 | Hoffmann | H02P 21/12 | 318/800 |
| 8,044,631 B2 * | 10/2011 | Dai | H02M 7/53873 | 318/727 |
| 8,077,491 B2 * | 12/2011 | Yamasaki | H02M 7/53873 | 363/132 |
| 8,836,258 B2 * | 9/2014 | Arisawa | H02M 7/5387 | 318/254.1 |
| 9,077,269 B2 * | 7/2015 | Nakamura | H02P 6/10 | 318/34 |
| 9,124,195 B2 * | 9/2015 | Weinmann | H02P 27/085 | 318/801 |

\* cited by examiner

|  | Su | Sv | Sw |
|---|---|---|---|
| V0 | 0 | 0 | 0 |
| V1 | 1 | 0 | 0 |
| V2 | 1 | 1 | 0 |
| V3 | 0 | 1 | 0 |
| V4 | 0 | 1 | 1 |
| V5 | 0 | 0 | 1 |
| V6 | 1 | 0 | 1 |
| V7 | 1 | 1 | 1 |

( 1 ··· UPPER ARM ON )
( 0 ··· LOWER ARM ON )

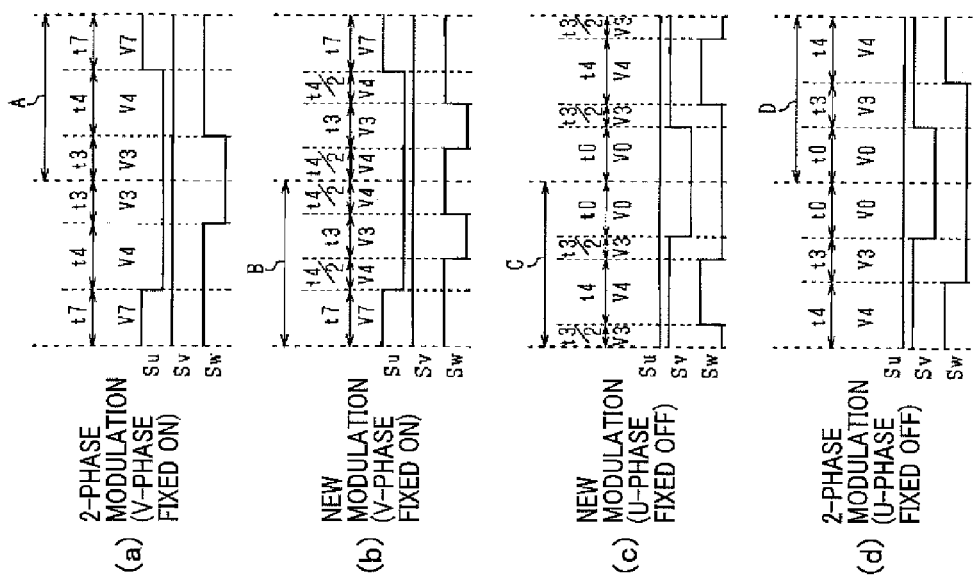
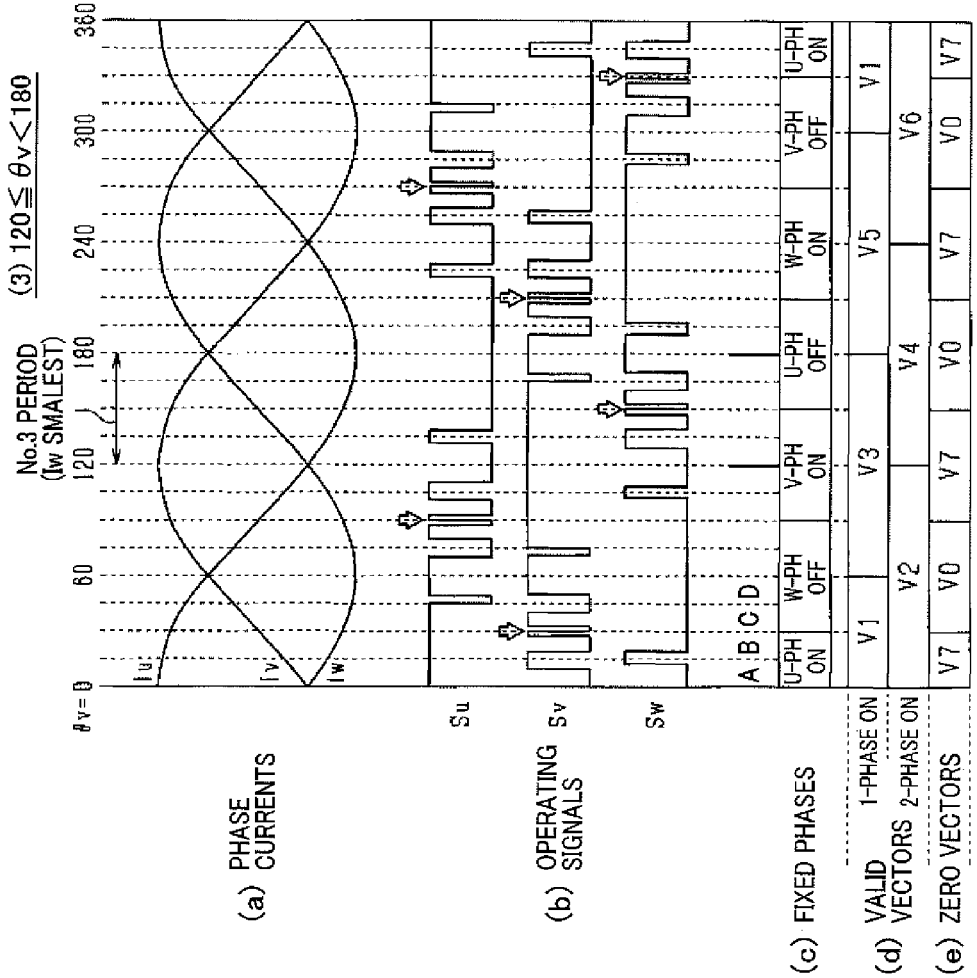
FIG. 7A
FIG. 7B

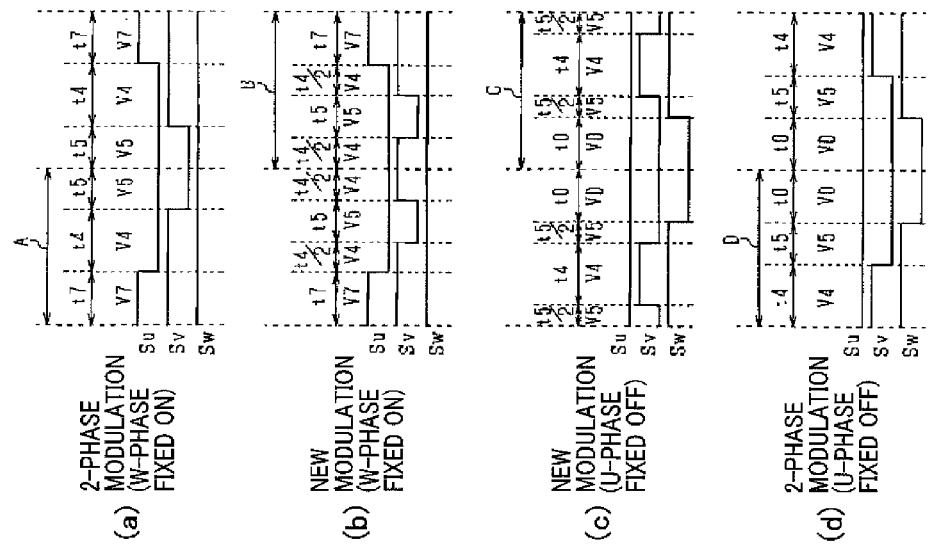
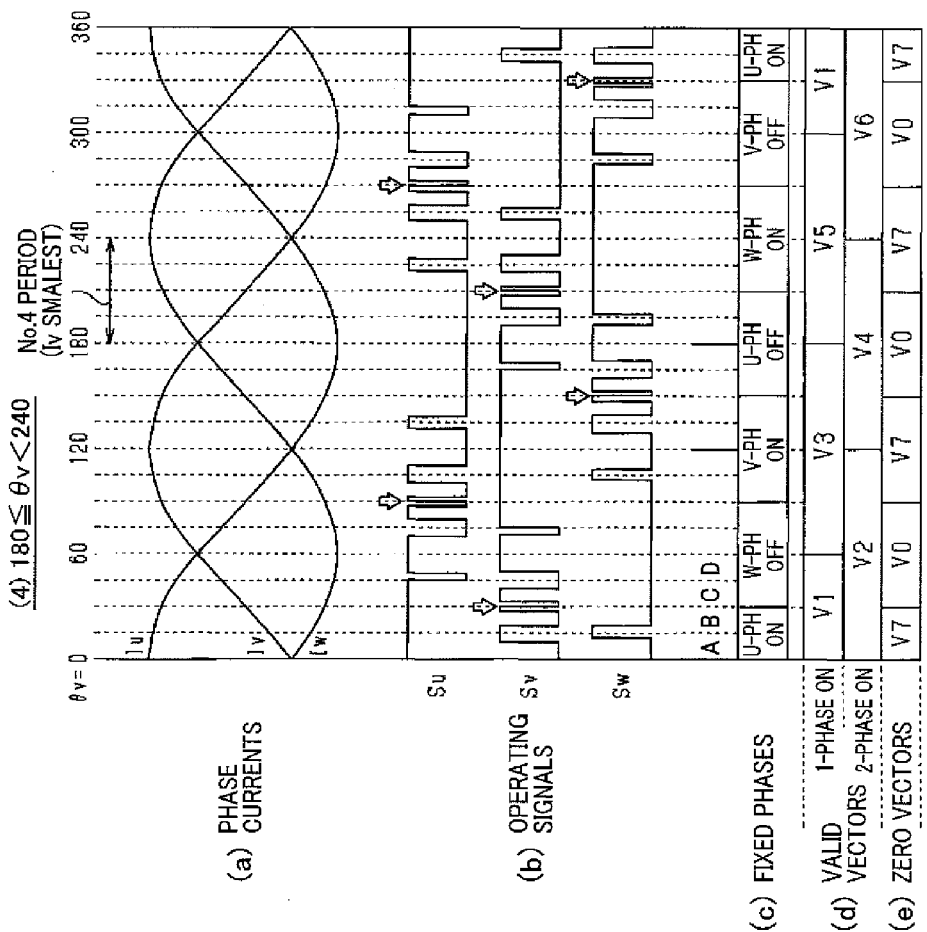
FIG.8A / FIG.8B

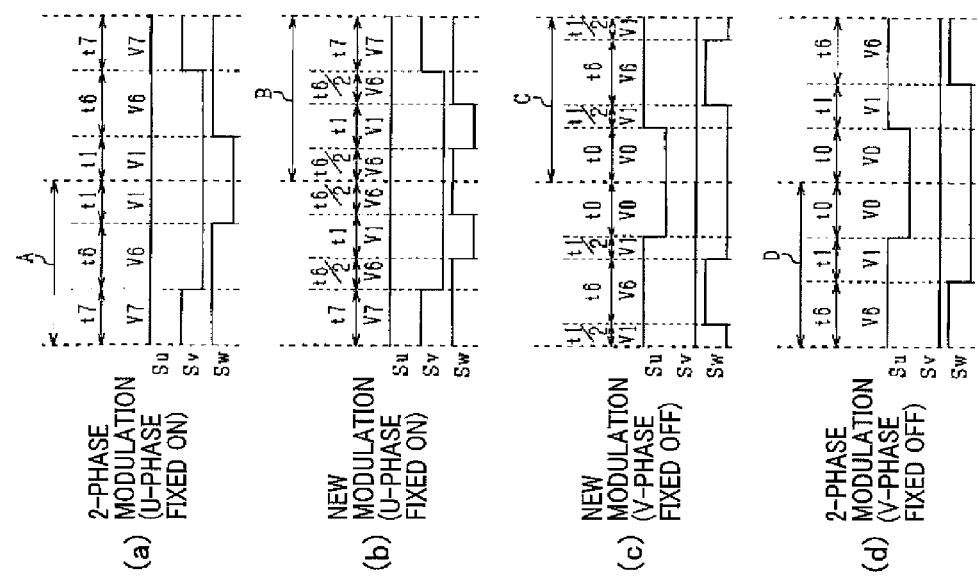
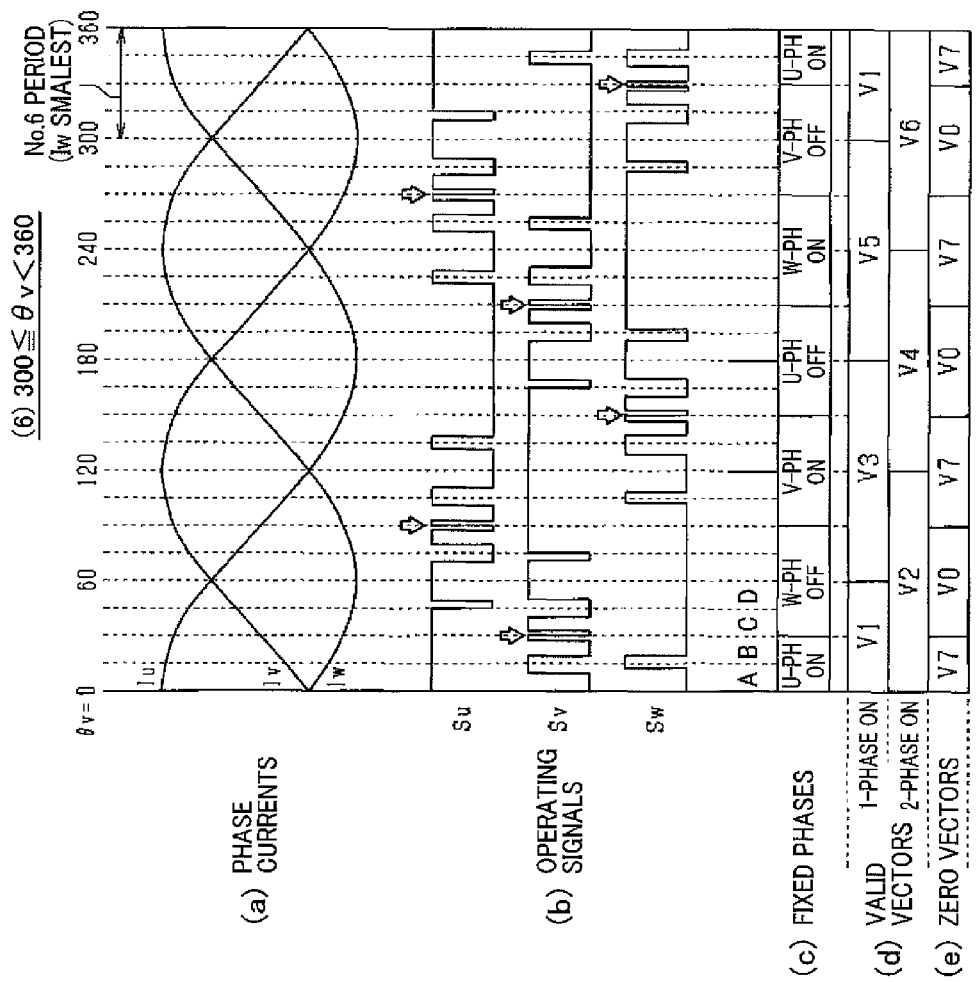

CONTROL APPARATUS FOR ELECTRIC POWER INVERTER

CROSS-REFERENCE TO RELATED APPLICATIONS

This application is based on and incorporates herein by reference Japanese Patent Application No. 2015-67916, filed on Mar. 30, 2015.

BACKGROUND OF THE INVENTION

The present invention relates to a control apparatus for an electric power inverter (referred to generally in the following simply as an inverter) which performs conversion between DC and AC electric power. In particular the invention relates to a control apparatus for a 3-phase inverter having three pairs of series-connected switching devices respectively corresponding to the three phases, the inverter serving to operate a 3-phase synchronous rotary machine.

Harmonic frequency components, resulting from PWM (pulse width modulation) control of switching operations of switching devices of a three-phase inverter, are superimposed upon AC currents that flow between the inverter and the rotary machine. The harmonic components produce audible noise, by causing vibration of parts of the rotary machine and also cause increased switching losses. Hence it is desirable to reduce the effects of such harmonic frequency components.

One method which has been proposed for dealing with this problem, while using conventional 3-phase modulation is to increase the switching frequency (PWM carrier frequency) of the inverter above the audible frequency range, for example above 20 kHz. However raising the switching frequency results in an increased amount of switching losses.

To reduce switching losses, it is possible to employ 2-phase modulation. With 2-phase modulation, in each of successive modulation periods, the operating state of one of the switching device(s) respectively corresponding to the three U, V, W phases is held fixed, with PWM modulation being applied only to the other two phases.

However 2-phase modulation is ineffective in reducing the audible noise problem caused by the harmonic frequency components. There is thus a need for improved technology whereby the audible noise can be suppressed without significantly increasing the switching losses.

SUMMARY OF THE INVENTION

Hence it is desired to overcome the above problems, by providing an inverter control apparatus for controlling a 3-phase inverter whereby, when the inverter is connected to a rotary machine, audible noise which results from operation of the rotary machine (due to harmonic frequency components superimposed on currents which flow between the inverter and the rotary machine) can be suppressed while avoiding an increase in switching losses.

A 3-phase inverter according to the present invention the inverter includes a plurality of switching devices corresponding to respective phases, and is applicable to a 3-phase rotary machine having respective phase windings electrically connected to the switching devices of the 3-phase inverter. The inverter control apparatus includes operating signal generating circuitry which generates PWM operating signals for controlling the switching devices of the 3-phase inverter to produce flows of AC current in the rotary machine.

The PWM operating signals are generated such that first and second predetermined conditions are satisfied, in each of successive processing periods (successive modulation periods). The one of the phases of the 3-phase inverter having the highest phase voltage (of the three phases) during a processing period is designated as the "highest phase" for that processing period. Similarly, the phase having the lowest voltage is designated as the "lowest phase" for that processing period, and the phase having a voltage intermediate between those of the highest phase and lowest phase is designated as the "intermediate phase". The first predetermined condition is that, in each processing period, the state of a switching device corresponding to the highest phase is held fixed throughout the processing period. The second predetermined condition is that, during each processing period, the state of a switching device corresponding to the lowest phase undergoes a greater number of switching state transitions than a switching device corresponding to the intermediate phase.

The amount of switching losses of the system consisting of the inverter and the rotary machine is increased in accordance with increase of the switching frequency of the inverter and with increased level of the current that is switched. As a result of satisfying the first predetermined condition, the frequency of switching high values of phase current is lowered, thereby reducing the switching losses. As a result of satisfying the second predetermined condition, only the frequency of switching low values of phase current is increased. The switching frequency can thereby be raised sufficiently above the audible frequency range to eliminate the problem of mechanical noise being audible. However since the switching is performed only at timings when the phase current is low, there is not a significant increase in switching losses caused by the increase in switching frequency.

BRIEF DESCRIPTION OF THE DRAWINGS

FIGS. 7A and 7B are diagrams illustrating modulation by voltage vectors in a range ($120° \leq \theta v < 180°$);

FIGS. 8A and 8B are diagrams illustrating modulation by voltage vectors in a range ($180° \leq \theta v < 240°$);

FIGS. 10A and 10B are diagrams illustrating modulation by voltage vectors in a range ($300° \leq \theta v < 360°$);

DESCRIPTION OF PREFERRED EMBODIMENTS

First Embodiment

A first embodiment will be described, which is an inverter control apparatus for installation in a motor vehicle such as electric vehicle or hybrid vehicle. The inverter control apparatus of the embodiment controls a 3-phase power inverter which is connected to a 3-phase motor-generator of the vehicle. The operation of the motor-generator as a 3-phase synchronous motor is described in the following.

Figure 1:
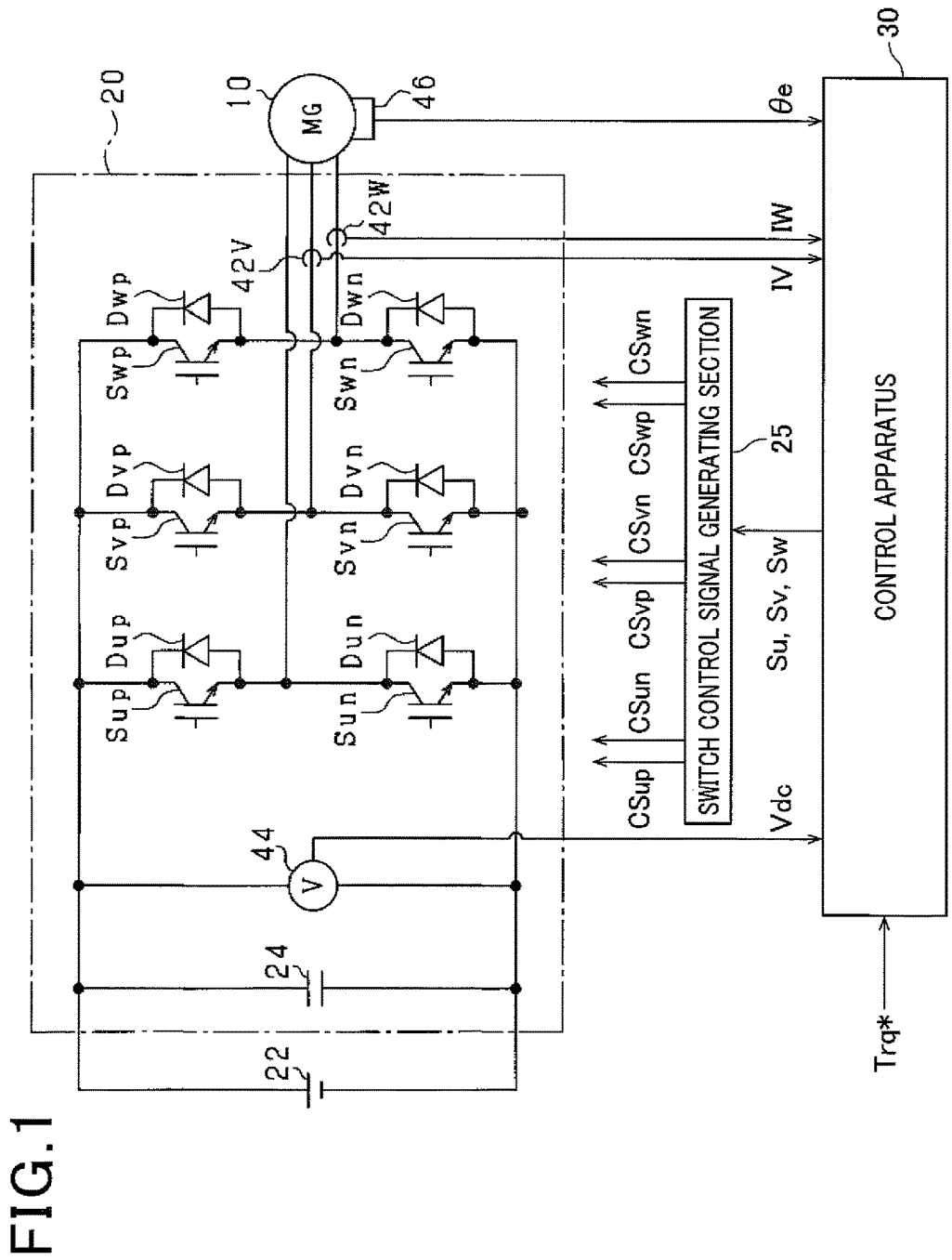
FIG. 1 is an overall system diagram of a motor control system incorporating a first embodiment of an inverter control apparatus.

FIG. 1 is a general circuit diagram of a motor control system of the vehicle. As shown, the motor control system includes a motor-generator 10, a inverter 20, and a inverter control apparatus 30 which controls the motor-generator 10 via a switch control signal generating section 25. The motor-generator 10 is the main motive apparatus of the vehicle, and is coupled to the road wheels (not shown in the drawings) of the vehicle. The motor-generator 10 of the embodiment is an IPMSM (Interior Permanent Magnet Synchronous Motor) type of motor-generator.

The motor-generator 10 is connected via the inverter 20 to a battery 22 serving as a DC power source, which produces an output voltage of several hundred volts. A smoothing capacitor 24 is connected in parallel with the battery 22, between the battery 22 and the inverter 20, for smoothing the input supply voltage of the inverter 20.

It would be possible to connect a voltage step-up converter between the battery 22 and the inverter 20. In that case, the voltage step-up converter would constitute the DC power source for the inverter 20.

The switching devices of the inverter 20 consist of upper-arm switches Sup, Svp, Swp, and lower-arm switches Sun, Svn and Swn, with the switches Sup, Sun connected in series, the switches Svp, Svn connected in series, and the switches Swp, Swn connected in series. As shown in FIG. 1, the U-phase lead of the motor-generator 10 is connected to the junction of the switches Sup, Sun, the V-phase lead of the motor-generator 10 is connected to the junction of the switches Svp, Svn, and the W-phase lead of the motor-generator 10 is connected to the junction of the switches Swp, Swn. With this embodiment, semiconductor devices are used as the upper-arm switches Sup, Svp, Swp and the lower-arm switches Sun, Svn and Swn, specifically IGBTs (Insulated Gate Bipolar Transistors). Freewheel diodes Dup, Dvp, Dwp, Dun, Dvn, Dwn are connected for reverse conduction in parallel with the switches Sup, Svp, Swp, Sun, Svn and Swn respectively.

The motor control system also includes a phase current detection section, a voltage detection section and a rotation angle detection section as described hereinafter. The phase current detection section detects the level of current flow of at least two of the three phases. With this embodiment, the phase current detection section utilizes a V-phase current sensor 42V and a W-phase current sensor 42W for respectively detecting the levels of V-phase current and W-phase current which flow between the motor-generator 10 and the inverter 20. The voltage detection section includes a voltage detector 44 which detects the input voltage of the inverter 20, i.e., the voltage appearing between the terminals of the smoothing capacitor 24. The rotation angle detection section utilizes a rotation angle sensor 46 (for example, a resolver) to detect the rotation angle of the motor-generator 10 to thereby obtain a detected phase angle value designated as the electrical phase angle θe.

The inverter control apparatus 30 is based on a processor (e.g., microcomputer) which executes a stored program to perform various functions described in the following, and one or more memory devices having data stored therein beforehand which map various input variable quantities to corresponding output quantities, for use by the microcomputer in executing the stored program. The inverter control apparatus 30 thereby controls the inverter 20 for driving the motor-generator 10 such as to bring the generated torque towards a target torque designated as Trq* (the control quantity of the motor-generator 10, with this embodiment). The inverter control apparatus 30 generates a U-phase operating signal Su corresponding to the U-phase, a V-phase operating signal Sv corresponding to the V-phase, and a W-phase operating signal Sw corresponding to the W-phase, which are supplied to the switch control signal generating section 25. The switch control signal generating section 25 thereby generates switch control signals CSup and CSun for controlling the U-phase switches Sup, Sun respectively, CSvp and CSvn for controlling the V-phase switches Svp, Svn respectively, and CSwp and CSwn for controlling the W-phase switches Swp, Swn, respectively. Each of the upper-arm switches Sup, Svp, Swp executes complementary switching with respect to the corresponding one of the lower-arm switches Sun, Svn and Swn. The phase currents which thereby flow in the U, V and W stator windings of the motor-generator 10, designated as the U-phase current Iu, V-phase current Iv and W-phase current Iw, are sinusoidal and differ in phase by 120 degrees.

The target value of torque Trq* may be supplied for example from an external control apparatus having a higher level than the inverter control apparatus 30.

The torque control of the motor-generator 10 performed by the inverter control apparatus 30 will be described referring to FIG. 2.

Figure 2:
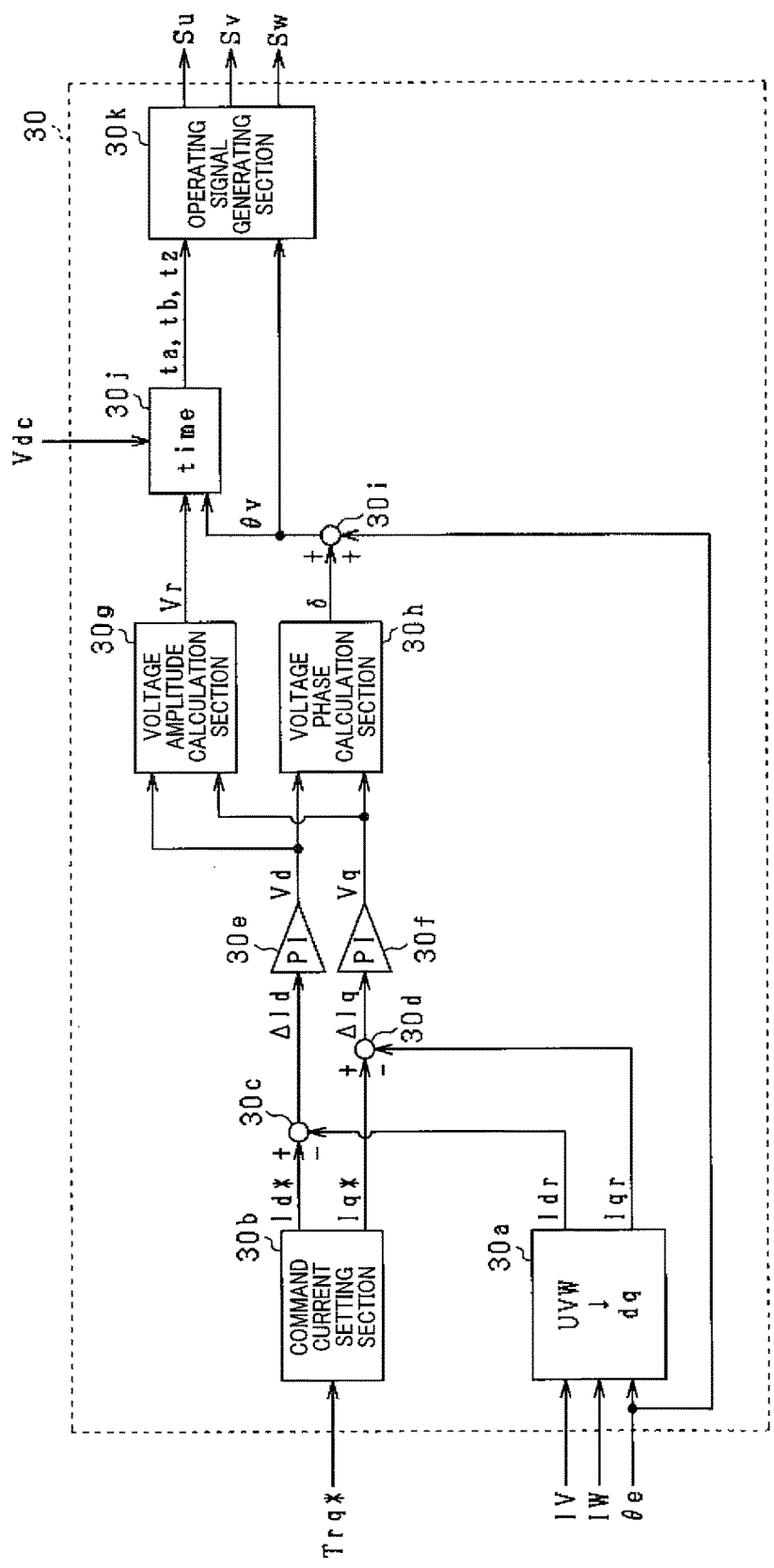
FIG. 2 is a block diagram of the first embodiment of an inverter control apparatus.

As shown in FIG. 2, the inverter control apparatus 30 consists of a two-phase conversion section 30a, a command current setting section 30b, subtracters 30c and 30d, a d-axis command voltage calculation section 30e, a q-axis command voltage calculation section 30f, a voltage amplitude calculation section 30g, a voltage phase calculation section 30h, a continuation time calculation section 30j, an adder 30j, and an operating signal generating section 30k. With this embodiment, each period referred to as a "processing period" corresponds to a PWM modulation period, having duration Ts. Based on sample values of V-phase current Iv detected by the voltage sensor 42v and W-phase current Iw detected by the current sensor 42w, and the electrical phase angle ee that is detected by the rotation angle sensor 46, the two-phase conversion section 30a converts the values of U-phase current Iu, V-phase current Iv and W-phase current Iw in a 3-phase coordinate system to values of d-axis current Idr and q-axis current Iqr in a 2-phase rotating coordinate system (dq coordinate system). The value of U-phase current Iu is calculated from the V-phase current Iv and the W-phase current Iw, using Kirchoff's law.

The command current setting section 30b sets values of d-axis and q-axis command currents Id* and Iq* based on the target torque Trq* and on data (map data) stored beforehand which relates electrical characteristics and torque characteristics of the motor-generator 10. The subtractor 30c obtains a d-axis current error ΔId by subtracting the d-axis current Idr from the d-axis command current Id*. The subtractor 30d obtains a q-axis current error ΔIq by subtracting the q-axis current Iqr from the q-axis command current Iq*.

Based on the d-axis current error ΔId, the d-axis command voltage zo calculation section 30e calculates a d-axis command voltage Vd as a control quantity for feedback control of the d-axis command current Id*. Based on the q-axis current error ΔIq, the d-axis command voltage calculation section 30e calculates a q-axis command voltage Vq as a control quantity for feedback control of the q-axis command current Iq*. With this embodiment, PI (proportional-integral) feedback control is employed.

The voltage amplitude calculation section 30g calculates the magnitude of a voltage vector (command voltage vector) Vdq of the inverter 20. As illustrated in FIG. 3B, the voltage vector Vdq is expressed in a rotating coordinate system, based on the d-axis and q-axis command voltages Vd and Vq, with the magnitude designated as Vr (calculated as the square root of the sum of the squares of the d-axis and q-axis command voltages Vd and Vq).

Figure 3:
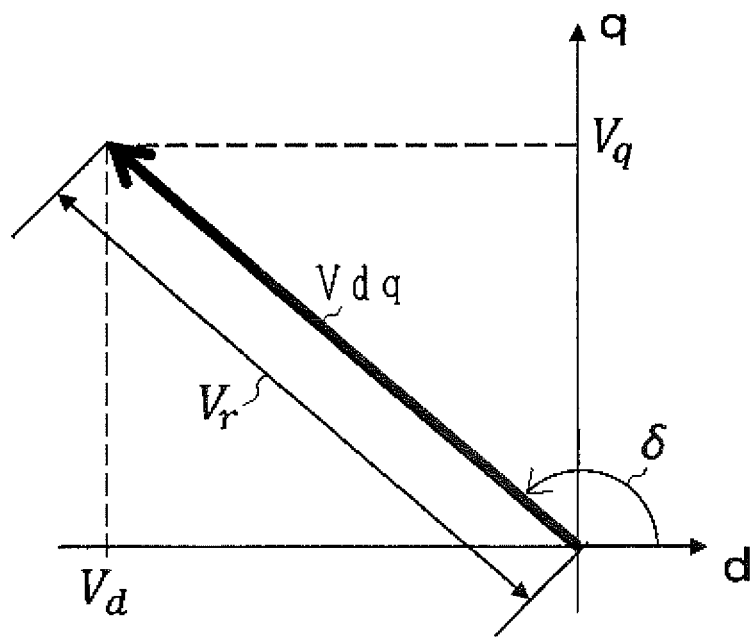
FIG. 3 is a diagram of a voltage vector in a dq coordinate system.

Based on the d-axis and q-axis command voltages Vd and Vq, the voltage phase calculation section 30h calculates the phase angle of the voltage vector Vdq, designated as the voltage phase angle δ. With this embodiment, as shown in FIG. 3, the positive direction of increase of δ is defined as the counter-clockwise direction of rotation, from the d-axis as a reference angle (i.e., rotation from the positive direction of the d-axis towards the positive direction of the q-axis). The voltage vector Vdq having the magnitude Vr calculated by the voltage amplitude calculation section 30g and phase angle δ calculated by the voltage phase calculation section 30h for a processing period is applied as the command voltage vector for that processing period.

The adder 30l calculates the sum of the voltage phase angle δ and the electrical phase angle θe to obtain an angular value referred to herein as the real phase angle θv. This is the phase angle of the voltage vector Vdq expressed with reference to the U-phase angle in a fixed rectangular coordinate system of the inverter control apparatus 30, shown as a space vector diagram in FIG. 4B. With this embodiment as shown, the voltage vector Vdq (command voltage vector) rotates in the counter-clockwise direction from the U-phase angle as a (0°) reference, as a positive direction of increase in phase angle.

Figures 4A, 4B:
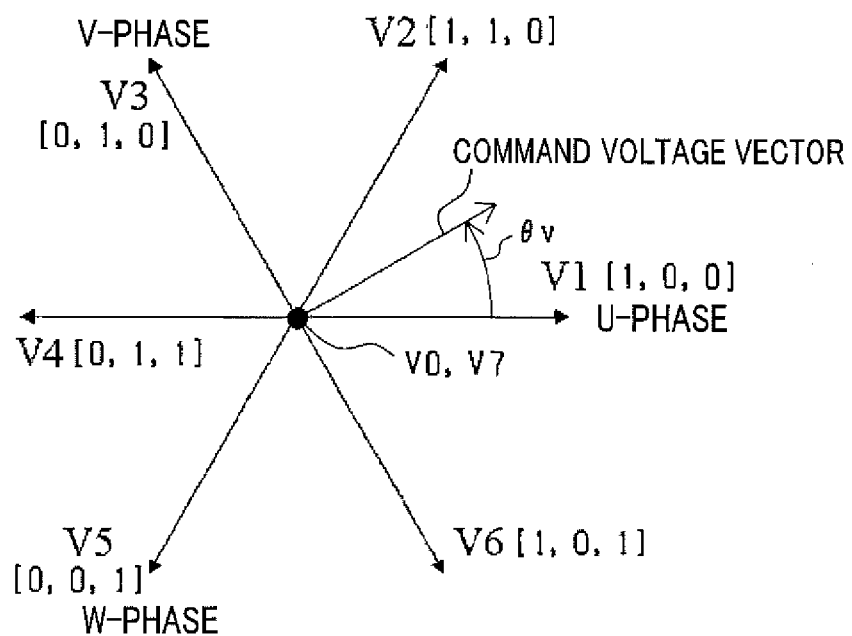
FIGS. 4A and 4B are diagrams for describing relationships between voltage vectors and operating signals controlling switching of the inverter control apparatus.

The processing executed by the continuation time calculation section 30j and by the operating signal generating section 30k will be described in the following. As shown in FIG. 4B there are 8 basic voltage vectors, respectively corresponding to the 8 different (1, 0) combinations of the operating signals Su, Sv, Sw generated by the inverter control apparatus 30, shown in FIG. 4A. These respectively correspond to 8 combinations of switching states of the three pairs of switching devices (U-phase switches Sup, Sun, V-phase switches Svp, Svn, W-phase switches Swp, Swn). The voltage vectors are designated as V0 [0,0,0], V1 [1,0,0], V2 [1,1,0], V3 [0,1,0], V4 [0,1,1], V5 [0,0,1], V6 [1,0,1] and V7 [1,1,1]. Specifically, the operating signal state "1" in FIG. 4A signifies that the upper-arm switching device of the corresponding pair is in the on (conducting) state and the lower-arm switching device in the off (non-conducting) state, while "0" signifies that the lower-arm switching device of the pair is in the on state while the upper-arm switching device in the off state. The voltage vectors V1~V6, having a magnitude greater than 0, are designated as "valid vectors", and successively differ in phase by 60°. The voltage vectors V0 and V7, having a magnitude of 0, are designated as "zero vectors".

The basic function of the continuation time calculation section 30j and the operating signal generating section 30k is to perform space vector modulation of respective voltages applied to the U, V, W phase windings of the motor-generator 10 (i.e., by determining the timings and sequence of selecting the voltage vectors in each processing period) based on the operating signals Su, Sv, Sw, to bring an average vector of the phase voltages close to the command voltage vector in each processing period. This is done by determining respective sequence positions and continuation times of selected voltage vectors within each processing period. With this embodiment, two out of the six valid vectors and one of the zero vectors are selected to be set during a processing period. The two selected valid vectors are those which are currently adjacent to the command voltage vector.

For example in a processing period when the command vector is as shown in FIG. 4B, the valid vectors V1 and V2 are closest to the command voltage vector, and so are selected to be set during that processing period.

In each processing period, the one of the three U, V, W phases of the inverter 20 which will have the highest phase voltage is referred to in the following as the "highest phase" for that processing period, while the phase whose (average) phase voltage is to be the lowest (i.e., closest to a median value of the phase voltages) of the three is referred to as the "lowest phase" for that processing period, and the phase whose (average) phase voltage is to be between the highest and lowest values is designated as the intermediate phase.

The space vector modulation of this embodiment (i.e., setting sequence positions and continuation times for the voltage vectors of the inverter 20 within each processing period) is executed such that two predetermined processing conditions are satisfied.

The first processing condition is that, in each processing period, the state of the switching devices corresponding to the highest phase is left unchanged throughout that processing period (i.e., the operating signal Su, Sv or Sw corresponding to the highest phase is held unchanged). The effect of applying the first condition is to reduce the switching losses, since the frequency of switching high values of current is reduced.

The second processing condition is as follows. The number of switching operations of the switching devices corresponding to the lowest phase, during each processing period, is increased (with this embodiment, increased by one) relative to the number of switching operations of the switching devices corresponding to the intermediate phase. That is, the operating signal Su, Sv or Sw corresponding to the lowest phase undergoes a greater number of state transitions than does the operating signal corresponding to the intermediate phase.

The effect of the second processing condition is to increase the switching frequency (thereby counteracting the lowering of switching frequency that results from applying the first condition), without substantially increasing the switching losses, since switching of only low values of current is performed.

By applying the first and second processing conditions, the frequency of harmonic components superimposed on the currents flowing in the motor-generator 10 can be raised sufficiently above the audible frequency range, while avoiding significant increase in the switching losses. The effects obtained are zo illustrated in FIG. 12, which compares the results obtainable with the present embodiment with those obtainable with conventional 2-phase modulation, or with 3-phase modulation having the PWM frequency increased above the audible range.

In the following, the continuation times and sequence positions of the voltage vectors are described based on six periods designated as the No. 1 period~No. 6 period respectively, covering a range of 0° to 360° variation in real phase angle δv. Each of the No. 1 period~No. 6 period consists of two successive processing periods (with this embodiment, each processing period corresponding to 30° variation in θv). The first processing period consisting of two successive sub-periods designated as A and B, and the second processing period consisting of two successive sub-periods designated as C and D, (i.e., each sub-period having duration Ts/2, and corresponding to 15° variation in θv). It is assumed that the motor-generator 10 is operating at a power factor of 1.

Figure 5B:
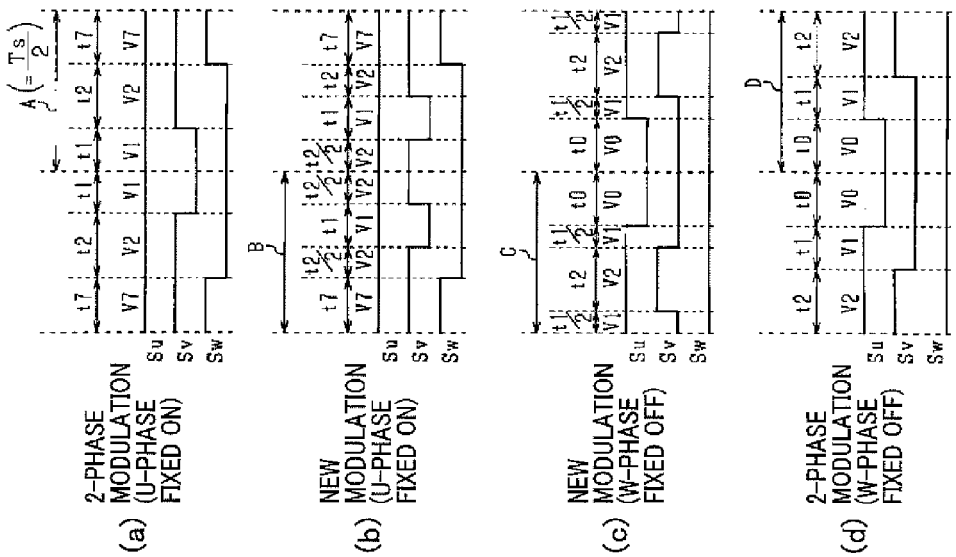
FIGS. 5A and 5B are diagrams illustrating modulation by voltage vectors in a range ($0° \leq \theta v < 60°$)
Figure 5A:
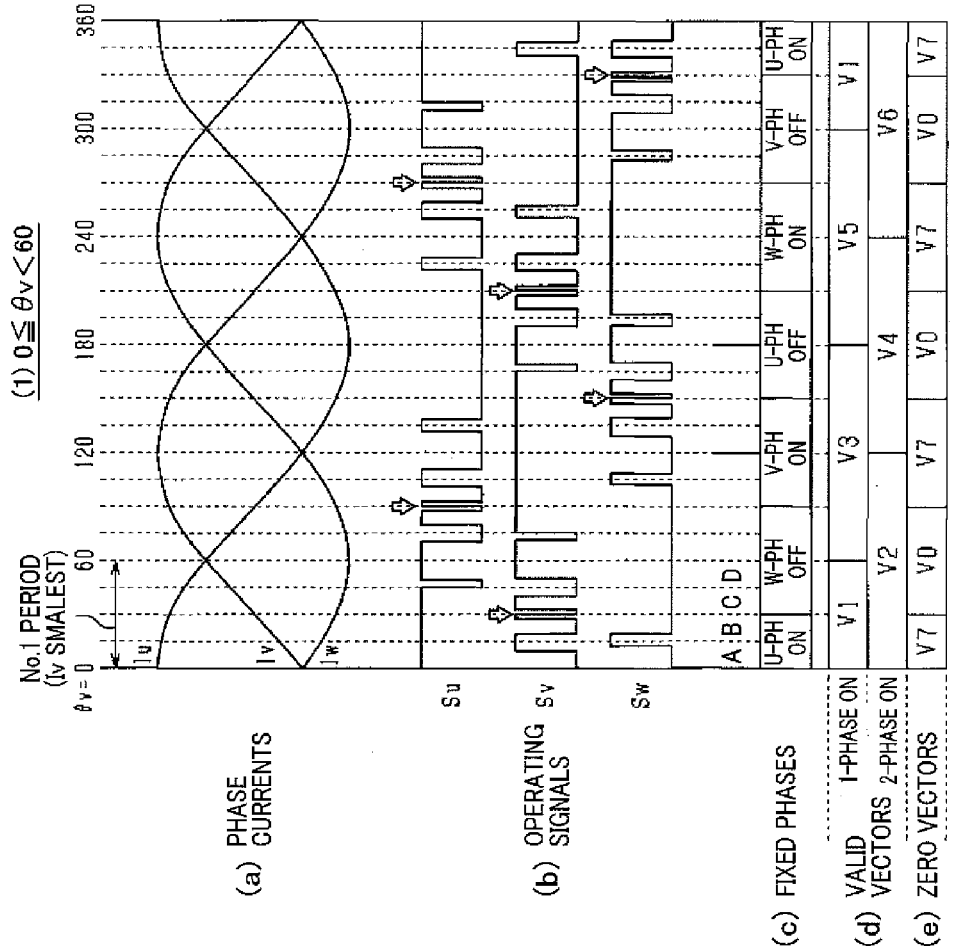

Sections (a) to (e) of FIG. 5A show the following changes occurring during the No. 1 period. Section (a) shows the changes in phase current, s section (b) shows the changes in the operating signals Su, Sv, Sw for the respective phases, and section (c) shows the phases for which the operation condition is held fixed. Section (d) shows the valid vectors that are selected within the No. 1 period. The timing and duration for which a valid voltage vector or a zero vector is selected are determined in accordance with the real phase angle θv (supplied to the continuation time calculation section 30j as described above referring to FIG. 2). Section (e) shows the zero vectors that are selected, with the vector V7 being selected within the first half of the No. 1 period and the vector V0 being selected within the second half. Sections (a), (b), (c), (d) of FIG. 5B show the timings and durations for which Operation During No. 1 Period (0°≤θv<60°)

Referring to FIGS. 5A, 5B, the No. 1 period (range 0°~60° of real phase angle θv) will first be described. In the first half of the No. 1 period (0°≤θv<30°, sub-period pair A, B) the No. 1 vector V1 and No. 2 vector V2 are selected as the valid vectors. The highest phase is the U-phase. Hence, to satisfy the first processing condition, the upper-arm switch Sup of the U-phase is held fixed in the on state and the lower-arm switch Sun is held fixed in the off state throughout the sub-periods A, B (i.e., throughout the first processing period in the No. 1 period).

The lowest phase is the V-phase, so that the W-phase is the intermediate phase.

In sub-period A, the voltage vector sequence is set as the No. 1 vector V1, the No. 2 vector V2, then the No. 7 vector V7. In the succeeding sub-period B, the voltage vector sequence is set as the No. 7 vector V7, the No. 2 vector V2, the No. 1 vector V1, then the No. 2 vector V2. Since the No. 2 vector V2 is selected after the No. 1 vector V1, the number of switching operations of the V-phase, which is the lowest phase, is increased by comparison with the W-phase, which is the intermediate phase. Hence, the second processing condition is satisfied, for the first processing period in the No. 1 period.

The operating signals Su, Sv, Sw corresponding to the respective voltage vectors during the sub-periods A and B (first processing period) of the No. 1 period are basically generated as follows, with this embodiment.

The inverter control apparatus 30 includes a memory section, not shown in the drawings, having data (pulse patterns) stored there expressing the operating signals Su, Sv, Sw. The inverter control apparatus 30 samples the phase current values Iv, Iw, and the voltage value Vdc, etc., in each processing period. The adder 30i calculates the real phase angle θv in each processing period, by adding respective values of θe and δ. The operating signal generating section 30k selects a voltage vector sequence in accordance with the real phase angle θv, and the continuation time calculation section 30j calculates respective continuation times for the selected voltage vectors, also in accordance with the real phase angle θv. Here, "continuation time" signifies the duration for which a voltage vector is selected during each of the two sub-periods of a processing period.

In the following a valid voltage vector whereby only the upper-arm switch of a single switch pair is in the on state (voltage vector V1, V3 or V5 shown in FIG. 4B) is designated as a "1-phase ON vector". A valid voltage vector whereby the respective upper-arm switches of two switch pairs (i.e., respectively corresponding to two of the U, V, W phases) are in the on state (voltage vector V2 or V4 in FIG. 4B) is designated as a "2-phase ON vector".

The continuation time calculation section 30j calculates the continuation time ta of each 1-phase ON vector based on the following equation (1)

$$ta = \frac{Ts}{2\sqrt{2}} \frac{Vr}{Vdc} \sin\left(\frac{\pi}{3} - \theta v\right) \tag{1}$$

In equation (1), Vdc is the voltage value detected by the voltage detector 44. The duration of the continuation time ta becomes increased in accordance with increase of the voltage magnitude Vr (command vector magnitude, shown in FIG. 3) and in accordance with decrease of the voltage level Vdc.

The continuation time calculation section 30j calculates the continuation time tb of each 2-phase ON vector based on the following equation (2):

$$tb = \frac{Ts}{2\sqrt{2}} \frac{Vr}{Vdc} \sin\theta v \tag{2}$$

The continuation time calculation section 30j calculates the continuation time tz for each zero vector based on the following equation (3):

$$tz = \frac{Ts}{2} - ta - tb \tag{3}$$

In sub-periods A, B of the No. 1 period (first processing period) the No. 1 vector V1 is the 1-phase ON vector, while the No. 2 vector V2 is the 2-phase ON vector, and the No. 7 vector V7 is the zero vector. Hence the voltage amplitude calculation section 30g calculates the continuation time t1 of the No. 1 vector V1, in or each of the sub-periods A, B of the No. 1 period, based on the above equation (1), using as input values the command voltage vector magnitude Vr, input voltage Vdc, and real phase angle θv. The continuation time calculation section 30j also uses these input values (Vr, Vdc, and θv) to calculate the continuation time t2 for the No. 2 vector V2 in each of the sub-periods A, B , based on equation (2) above. The continuation time calculation section 30j also adds together the continuation times t1, t2 of the No. 1 vector V1 and No. 2 vector V2, and subtracts the result from Ts/2 (equation (3) above) to obtain the continuation time t7 for the No. 7 vector V7 in each of the sub-periods A, B of the No. 1 period, as shown in sections (a), (b) of FIG. 5A.

In addition, the continuation time calculation section 30j divides the continuation time t2 of the No. 2 vector V2 (calculated using equation (2) above) by two, and sets the result (t2/2), as two continuation times of the No. 2 vector V2 within the sub-period B of the No. 1 period, as shown in section (b) of FIG. 5B.

Using for example a timer function, the operating signal generating section 30k sets the operating signals Su, Sv, Sw during the processing period (sub-periods A, B) based on the continuation times calculated by the voltage amplitude calculation section 30g, the time that has elapsed since the start of the sub-period A, and stored operating signal data (i.e., which map the relationships shown in FIG. 4A).

In the sub-periods C and D (30°≤θv<60°, second processing period) of the No. 1 period, the No. 1 vector V1 and No. 2 vector V2 continue to be selected as the valid vectors, and the W-phase is the highest phase. Hence, to satisfy the first processing condition in the sub-periods C and D, the upper-arm switch Swp of the W-phase is fixed in the off state and the lower-arm switch Swn is fixed in the on state. During the sub-periods C and D, the lowest phase continues to be the V-phase, so that the U-phase is the intermediate phase.

In sub-period C of the No. 1 period, the No. 1 vector V1, No. 2 vector V2, No. 1 vector V1, and No. 0 vector V0 are successively selected. The No. 1 vector V1 is selected prior to the No. 2 vector V2, so that the number of switching operations of the V-phase (the lowest phase) in the second processing period (sub-periods A, B) of the No. 1 period is made greater than those of the intermediate phase (the U-phase). Hence, the second processing condition is satisfied.

In sub-period D of the No. 1 period, the voltage vector sequence is set as the No. 0 vector V0, No. 1 vector V1 and No. 2 vector V2.

As can be understood from the above, it is ensured that the phase voltages of the U, V,W phases are switched sequentially (i.e., one at a time). Current surges which may damage the switching devices, caused by concurrent switching of two or more of the phases, are thereby avoided.

Operation During the No. 2 Period (60°≤θv<120°)

Figure 6A:
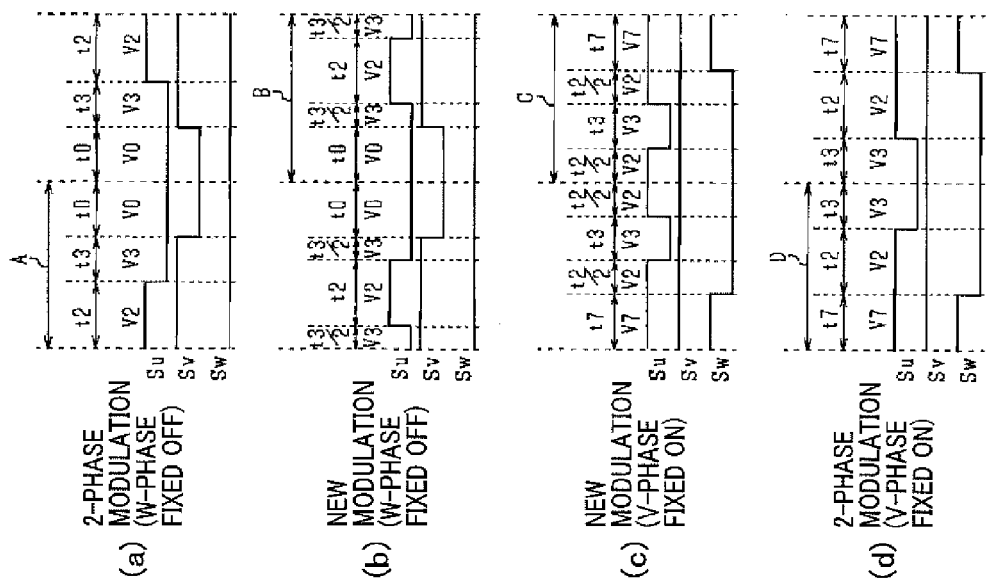
FIGS. 6A and 6B are diagrams illustrating modulation by voltage vectors in a range ($60° \leq \theta v < 120°$)
Figure 6B:
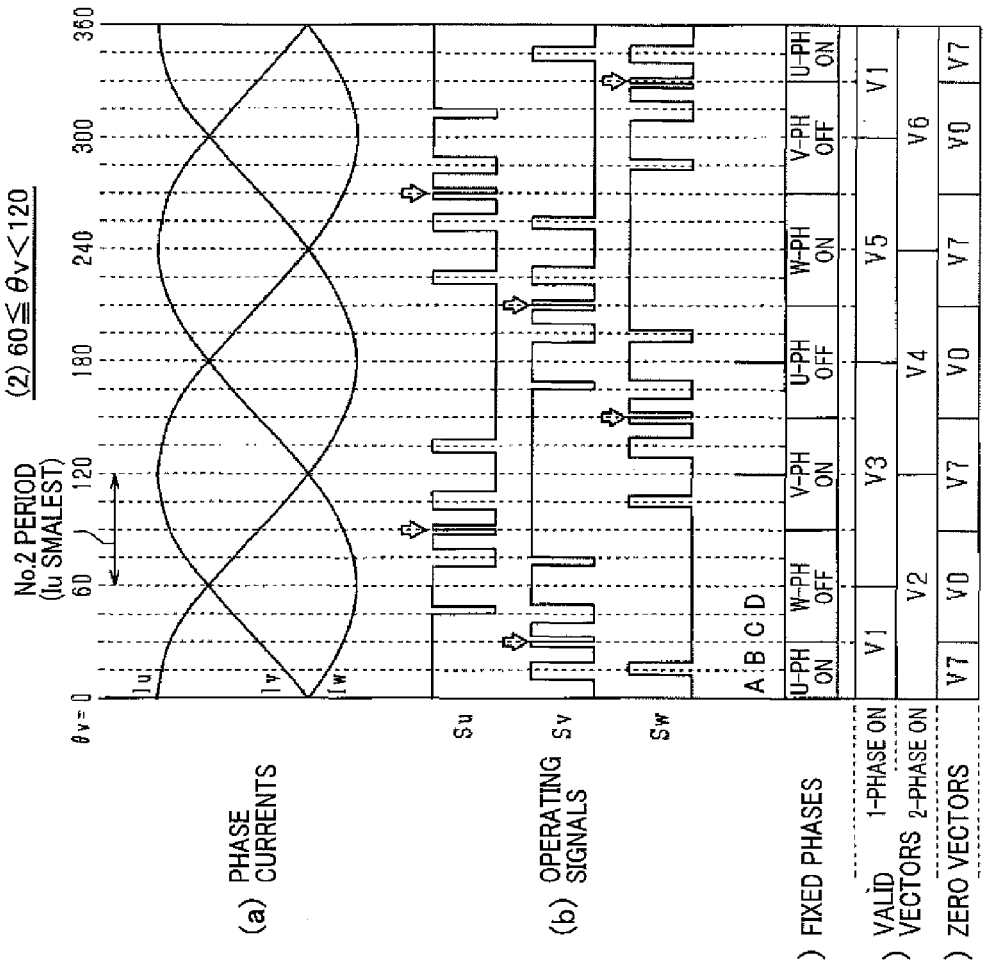

The operation in the No. 2 period (range 60°~120° of real phase angle θv) will be described referring to FIG. 6. Only the points of difference from the operation in the No. 1 period will be described.

In the sub-periods A and B (60°≤θv<90°) of the No. 2 period, the No. 2 vector V2 and No. 3 vector V3 are selected as the valid vectors, and the highest phase is the W-phase. Hence, to satisfy the first processing condition, the upper-arm switch Swp of the W-phase is fixed in the off state and the lower-arm switch Swn is fixed in the on state.

During the sub-periods A and B of the No. 2 period, the lowest phase is the U-phase, so that the V-phase is the intermediate phase. In sub-period A, the voltage vector sequence is set as the No. 2 vector V2, No. 3 vector V3, and No. 0 vector V0. In the succeeding sub-period B, the voltage vector sequence is set as the No. 0 vector V0, No. 3 vector V3, No. 2 vector V2, then No. 3 vector V3. Since the No. 3 vector V3 is selected after the No. 2 vector V2, the number of switching operations of the U-phase, which is the lowest phase, is increased by comparison with the V-phase, which is the intermediate phase. Hence, the second processing condition is satisfied, for first processing period of the No. 2 period.

In the sub-periods C and D (90°≤θv<120°) of the No. 2 period, the No. 2 vector V2 and No. 3 vector V3 continue to be selected as the valid vectors, and the V-phase is the highest phase. Hence, to satisfy the first processing condition in the sub-periods C and D, the upper-arm switch Svp of the V-phase is fixed in the on state and the lower-arm switch Svn is fixed in the off state. During the sub-periods C and D, the lowest phase continues to be the U-phase, so that the W-phase is the intermediate phase.

In sub-period C of the No. 2 period, the voltage vector sequence is set as the No. 2 vector V2, the No. 3 vector V3, the No. 2 vector V2, and the No. 7 vector 7. The No. 2 vector V2 is set prior to the No. 3 vector V3, so that the number of switching operations of the U-phase (the lowest phase) is made greater than those of the intermediate phase (the W-phase).

Next, in sub-period D, the voltage vector sequence is set as the No. 7 vector 7, No. 2 vector V2 , and No. 3 vector V3.

Operation During the No. 3 Period (120°≤θv<180°)

The operation in the No. 3 period (range 120°~180° of real phase angle θv) will be described referring to FIG. 7.

In sub-periods A and B (120°≤θv<150°, first processing period) of the No. 3 period, the No. 3 vector V3 and No. 4 vector V4 are selected as the valid vectors, and the highest phase is the V-phase. Hence, to satisfy the first processing condition, the upper-arm switch Svp of the V-phase is fixed in the on state and the lower-arm switch Svn is fixed in the off state.

During sub-periods A and B, the U-phase is the intermediate phase, since the lowest phase is the W-phase.

In sub-period A of the No. 3 period, the voltage vector sequence is set as the No. 3 vector V3, No. 4 vector V4, then No. 7 vector V7. In the succeeding sub-period B, the voltage vector sequence is set as No. 7 vector V7, No. 4 vector V4, No. 3 vector V3 then No. 4 vector V4. Since the No. 4 vector V4 is selected after the No. 3 vector V3, the number of switching operations of the W-phase (the lowest phase) is increased by comparison with the U-phase (the intermediate phase).

In the sub-periods C and D (150°≤θv<180°), the No. 3 vector V3 and No. 4 vector V4 continue to be selected as the valid vectors, and the U-phase is the highest phase. Hence, to satisfy the first processing condition in the sub-periods C and D, the upper-arm switch Sup of the U-phase is fixed in the off state and the lower-arm switch Sun is fixed in the on state. During the sub-periods C and D, the lowest phase continues to be the W-phase, so that the V-phase is the intermediate phase.

In sub-period C, the voltage vector sequence is set as the No. 3 vector V3, No. 4 vector V4, No. 3 vector V3, and No. 0 vector V0. The No. 3 vector V3 is set prior to the No. 4 vector V4, so that the number of switching operations of the lowest phase the (W-phase) is made greater than those of the intermediate phase (the V-phase).

Next, in sub-period D, the voltage vector sequence is set as the No. 0 vector 0, No. 3 vector V3, and No. 4 vector V4.

Operation During the No. 4 Period (180°≤θv<240°)

The operation in the No. 4 period (range 180°~240° of real phase angle θv) will be described referring to FIG. 8.

In sub-periods A and B (180°≤θv<210°) of the No. 4 period, the No. 4 vector V4 and No. 5 vector V5 are selected as the valid vectors, and the highest phase is the W-phase. Hence, to satisfy the first processing condition, the upper-arm switch Swp of the W-phase is fixed in the on state and the lower-arm switch Swn is fixed in the off state.

During sub-periods A and B, since the lowest phase is the V-phase, the U-phase is the intermediate phase.

In sub-period A, the voltage vector sequence is set as the No. 7 vector V7, the No. 4 vector V4, then the No. 5 vector V5. In the succeeding sub-period B, the voltage vector sequence is set as No. 4 vector V4, the No. 5 vector V5, the No. 4 vector V4 then the No. 7 vector V7. Since the No. 4 vector V4 is selected before the No. 5 vector V5, the number of switching operations of the V-phase, which is the lowest phase, is increased by comparison with the U-phase, which is the intermediate phase.

In the sub-periods C and D (210°≤θv<240°), the No. 4 vector V4 and No. 5 vector V5 continue to be selected as the valid vectors, and the U-phase is the highest phase. Hence, to satisfy the first processing condition in the sub-periods C and D (second processing period), the upper-arm switch Sup of the U-phase is fixed in the off state and the lower-arm switch Sun is fixed in the on state. The lowest phase continues to be the V-phase, so that the W-phase is the intermediate phase.

In sub-period C, the voltage vector sequence is set as No. 0 vector V0, No. 5 vector V5, No. 4 vector V4, and the No. 5 vector V5. The No. 3 vector V3 is set after the No. 4 vector V4, so that the number of switching operations of the V-phase (the lowest phase) is made greater than those of the intermediate phase (the W-phase).

Next, in sub-period D, the voltage vector sequence is set as the No. 4 vector V4, No. 5 vector V0, and No. 4 vector V4.

Operation During the No. 5 Period (240°≤θv<300°)

Figure 9A:
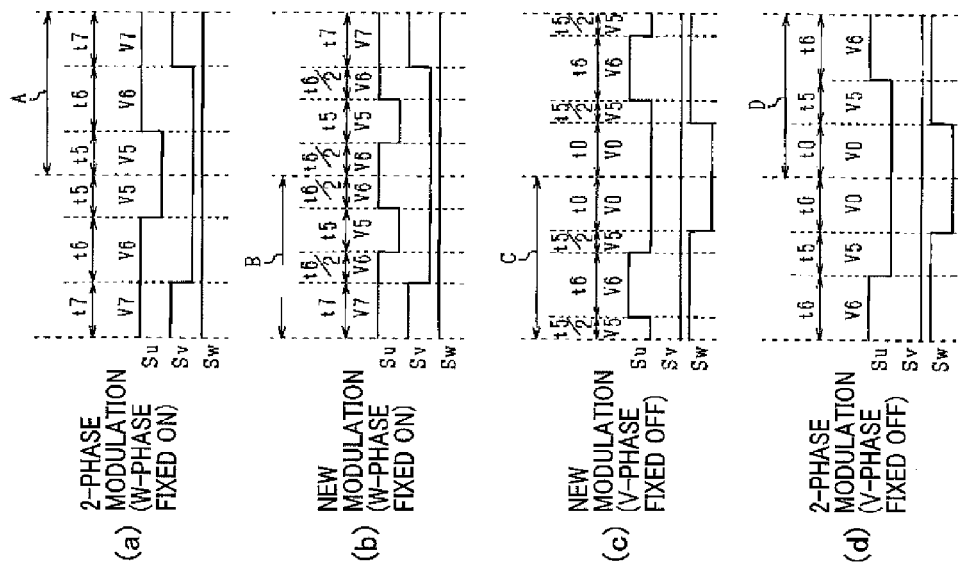
FIGS. 9A and 9B are diagrams illustrating modulation by voltage vectors in a range ($240° \leq \theta v < 300°$)
Figure 9B:
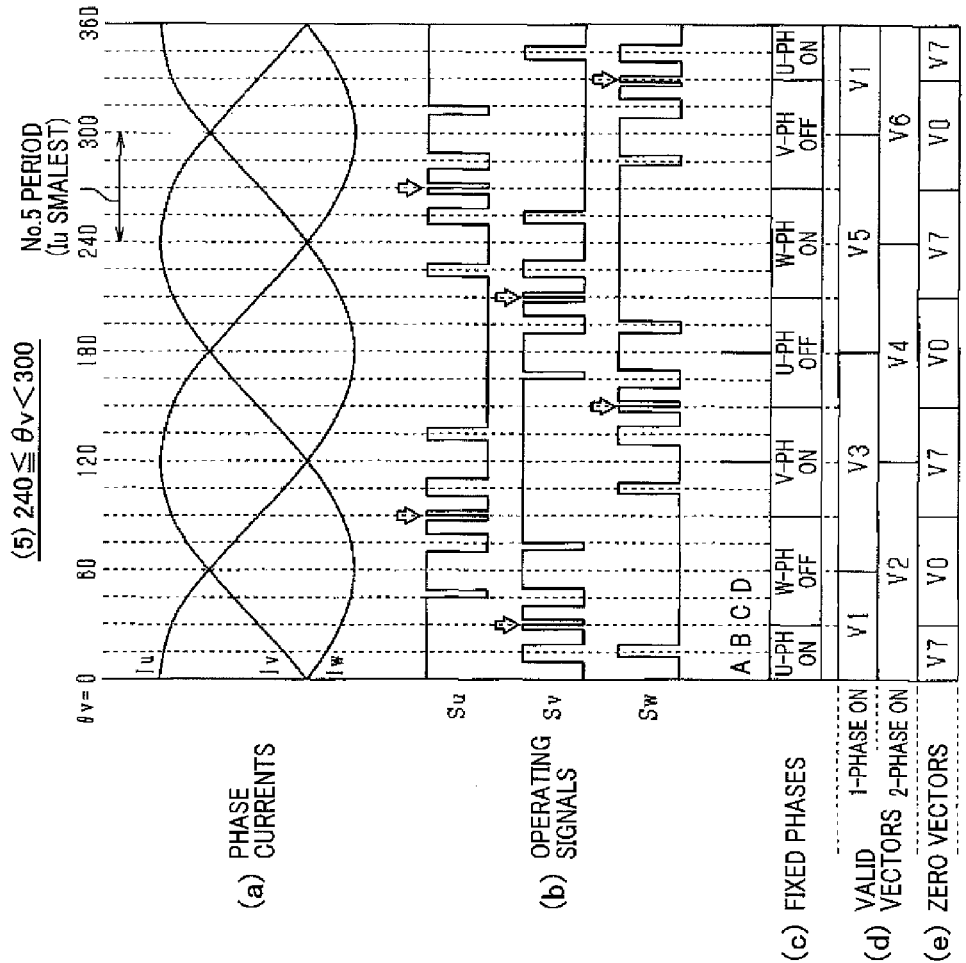

The operation in the No. 5 period (range 240°~300° of real phase angle θv) will be described referring to FIG. 9.

In sub-periods A and B (240°≤θv<270°) of the No. 5 period, the No. 5 vector V5 and No. 6 vector V6 are selected as the valid vectors, and the highest phase is the W-phase. Hence, to satisfy the first processing condition, the upper-arm switch Swp of the W-phase is fixed in the on state and the lower-arm switch Swn is fixed in the off state.

During sub-periods A and B, since the lowest phase is the U-phase, the V-phase is the intermediate phase.

In sub-period A, the voltage vector sequence is selected as No. 5 vector V5, No. 6 vector V6, then No. 7 vector V7. In the succeeding sub-period B, the voltage vector sequence is selected as No. 7 vector V7, No. 6 vector V6, No. 5 vector V5 then No. 6 vector V6. Since the No. 6 vector V6 is set as occurring after the No. 5 vector V5, the number of switching operations of the U-phase, which is the lowest phase, is increased by comparison with the V-phase, which is the intermediate phase.

In sub-periods C and D (270°≤θv<300°), the No. 5 vector V5 and No. 6 vector V6 are selected as the valid vectors, and the V-phase is the highest phase. Hence, to satisfy the first processing condition in the sub-periods C and D, the upper-arm switch Svp of the V-phase is fixed in the off state and the lower-arm switch Svn is fixed in the on state. The lowest phase is the U-phase, so that the W-phase is the intermediate phase.

In sub-period C, the voltage vector sequence is set as the No. 5 vector V5, No. 6 vector V6, No. 5 vector V5, and No. 0 vector V0. The No. 5 vector V5 is selected before the No. 6 vector V6, so that the number of switching operations of the U-phase (the lowest phase) is made greater than those of the intermediate phase (the W-phase).

Next, in sub-period D, the voltage vector sequence is set as the No. 0 vector V0, No. 5 vector V5, and No. 6 vector V6.

Operation During the No. 6 Period (300°≤θv<360°)

The operation in the No. 6 period (range 300°~360° of real phase angle θv) will be described referring to FIG. 9.

In the sub-periods A and B (300°≤θv<330°), the No. 1 vector V1 and No. 6 vector V6 are selected as the valid vectors, and the highest phase is the U-phase. Hence, to satisfy the first processing condition, the upper-arm switch Sup of the U-phase is fixed in the on state and the lower-arm switch Sun is fixed in the off state.

During sub-periods A and B, since the lowest phase is the W-phase, the V-phase is the intermediate phase.

In sub-period A, the voltage vector sequence is set as the No. 7 vector V7, No. 6 vector V6, then No. 1 vector V1. In the succeeding sub-period B, the voltage vector sequence is set as No. 6 vector V6, No. 1 vector VI, No. 6 vector V6, then the No. 7 vector V7. Since the No. 6 vector V6 is selected before the No. 1 vector V5, the number of switching operations of the W-phase, which is the lowest phase, is increased by comparison with the V-phase, which is the intermediate phase.

In sub-periods C and D (330°≤θv<360°), the No. 1 vector V1 and No. 6 vector V6 are selected as the valid vectors, and the V-phase is the highest to phase. Hence, to satisfy the first processing condition in the sub-periods C and D, the upper-arm switch Svp of the V-phase is fixed in the off state and the lower-arm switch Svn is fixed in the on state. The lowest phase continues to be the U-phase, so that the W-phase is the intermediate phase.

In sub-period C, the voltage vector sequence is set as the No. 0 vector V0, No. 1 vector V1, No. 6 vector V6, and No. 1 vector V1. The No. 1 vector V1 is set after the No. 6 vector V6, so that the number of switching operations of the W-phase (the lowest phase) is made greater than those of the intermediate phase (the U-phase).

Next, in sub-period D, the voltage vector sequence is set as the No. 6 vector V6, the No. 1 vector V1, and the No. 0 vector V0.

Figure 11:
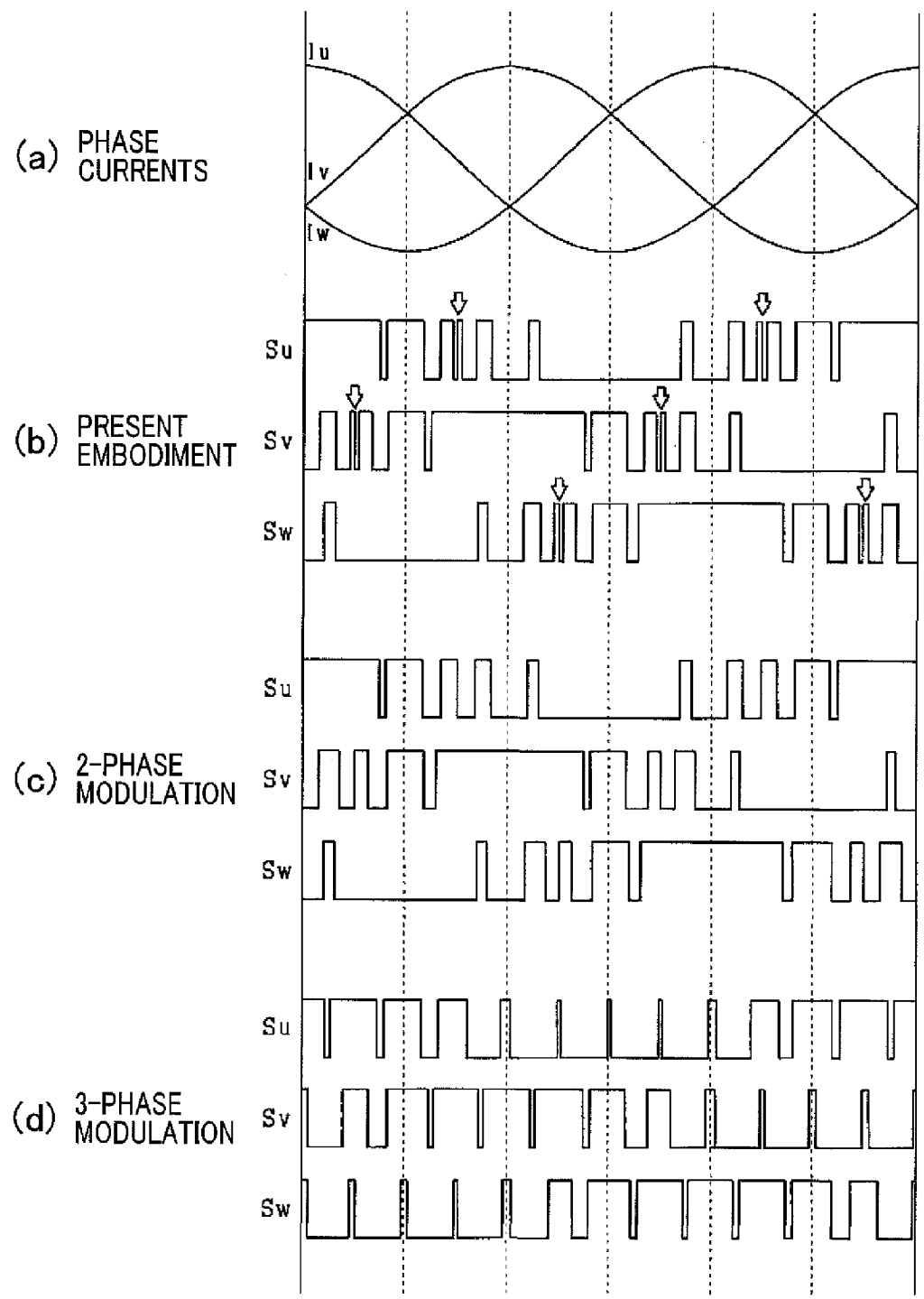
FIG. 11 is a diagram for comparing operating signals of the present invention, 2-phase modulation and 3-phase modulation, respectively.

The effects obtained with the present invention will be described referring to FIGS. 11 and 12. Firstly, the switching transitions of the operating signals Su, Sv, Sw for the case of the present invention and the case of (conventional) 2-phase modulation will be compared, referring to diagrams (b) and (c) of FIG. 11. As shown, in the case of the present invention (first embodiment) the switching frequency of the operating signals Su, Sv, Sw is increased, by comparison with the use of 2-phase modulation. Diagram (d) of FIG. 11 shows the switching transitions of the operating signals Su, Sv, Sw for the case of conventional 3-phase modulation.

Figure 12:
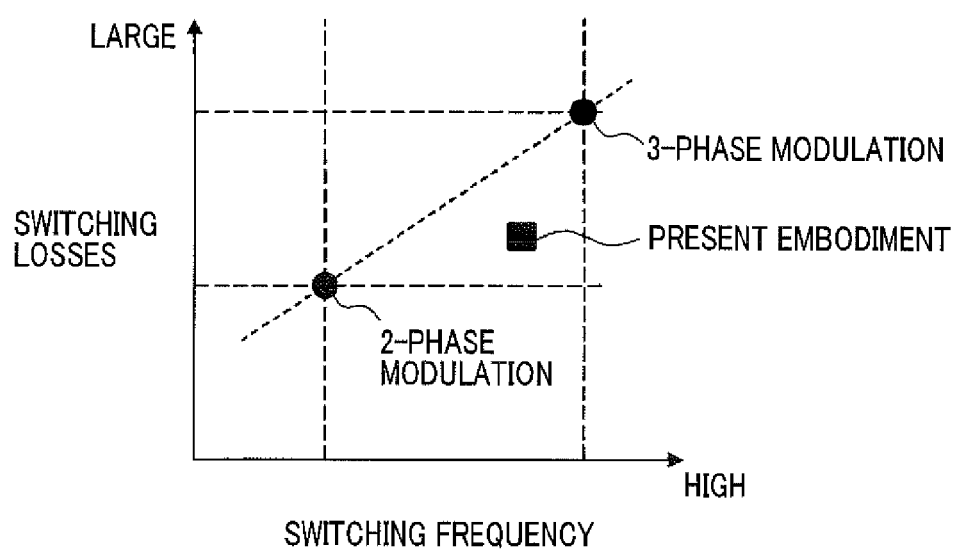
FIG. 12 is a diagram comparing relationships between switching losses and switching frequency for the case of results obtained with the present invention, 2-phase modulation and 3-phase modulation, respectively.

The switching frequencies and the switching losses obtained for the cases of the present invention (above embodiment), 2-phase modulation, and 3-phase modulation respectively are compared in FIG. 12.

With the present invention, the number of switching transitions occurring in each processing period (i.e., of duration equal to a PWM modulation carrier period) is increased by comparison with the case of 2-phase modulation. Hence, the frequency of mechanical noise due to switching can be raised above the audible frequency range while using a longer value of PWM modulation carrier period (lower value of carrier frequency) than would be required with 2-phase modulation. This is achieved without significantly increasing the switching losses, i.e., avoiding the problem that arises if 3-phase modulation is used, and the modulation frequency is increased sufficiently to raise the mechanical noise above the audible frequency range.

Furthermore the results can be obtained without increasing the carrier frequency of PWM modulation and thereby shortening the processing period (Ts) of current feedback control. A consequent increase in the processing load imposed on the inverter control apparatus 30, due to shortening of the processing period, can thus be avoided.

Second Embodiment

Figure 13:
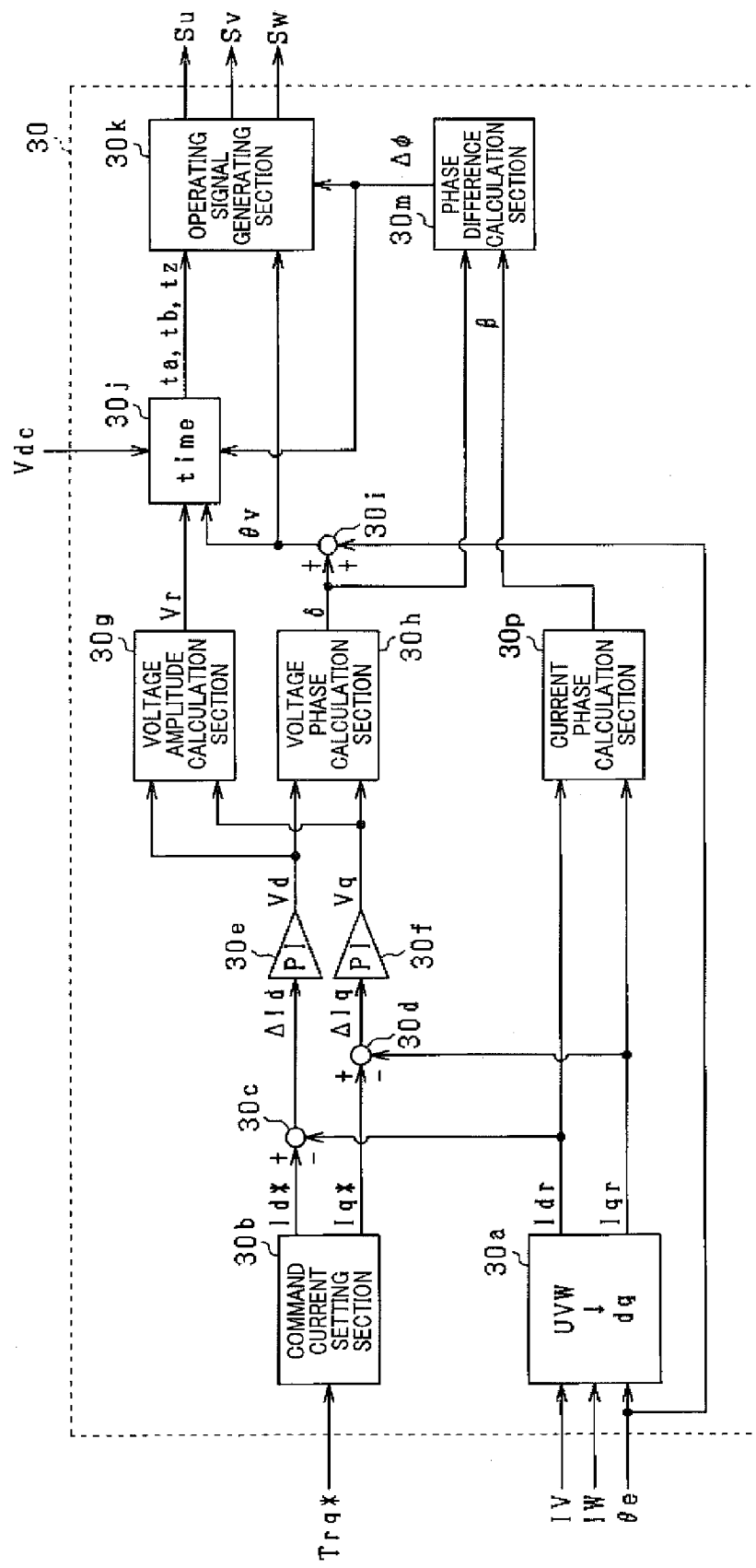
FIG. 13 is a block diagram of a second embodiment of an inverter control apparatus; and, FIG. 14 is a diagram illustrating a phase difference between a voltage vector and a current vector in a dq coordinate system.

A second embodiment will be described referring to FIG. 13. Only the features which differ from those of the first embodiment will be specifically described. With the second embodiment as shown in FIG. 13 the inverter zo control apparatus 30 further includes a phase difference calculation section 30m and a current phase calculation section 30p. The main objective of this configuration is to reduce the switching losses more reliably than with the first embodiment. The switching losses of each of the U, V, W phases are approximately proportional to the absolute value of phase current. Hence to reduce the switching losses, it is necessary in each of successive processing periods to fix the state of the switching devices of the phase corresponding to the highest absolute value of phase current.

With the first embodiment, it is assumed that the motor-generator 10 is operating at a power factor of 1. However in practice the power factor may differ from 1, i.e., there may be a phase difference between the applied voltage and current of each of the U, V, W phases, depending upon the running condition of the motor-generator 10. Hence the highest phase may be incorrectly selected in each processing period, causing a danger of increased switching losses.

Figure 14:
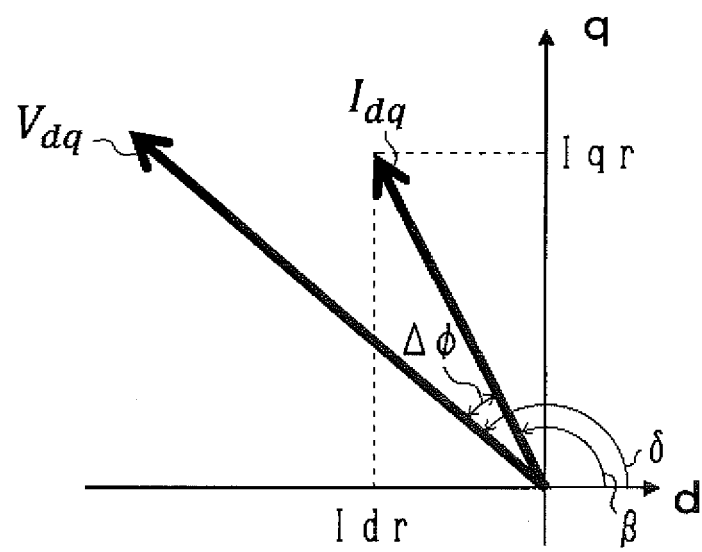

Thus with the second embodiment, the current phase calculation section 30p calculates the phase angle (referred to in the following as the current phase angle β) of the current vector Idq, based on the d-axis and q-axis currents Idr, Iqr. With this embodiment as shown in FIG. 14, the current phase angle β has the positive direction of the d-axis as reference, and takes increasing values with rotation in the counter-clockwise direction from that reference.

The phase difference calculation section 30m calculates the phase difference Δϕ between the voltage vector Vdq and the current vector Idq by subtracting the current phase angle β from the voltage phase angle δ.

With the first embodiment, the operating signal generating section 30k and the continuation time calculation section 30j determine the No. 1 to No. 6 periods based on the values of the real phase angle θv. However with the second embodiment, the No. 1 to No. 6 periods are determined based on θv and the phase difference Δϕ. For example the No. 1 period is set as the range (0°≤(θv−Δϕ)<60°) of variation of the real phase angle θv, as opposed to the range (0°≤θv<60°) in the case of the first embodiment. In other respects the operation is identical to that of the first embodiment described above.

The second embodiment thus provides the advantages described for the first embodiment, while ensuring that the switching losses are more reliably reduced when the power factor of the rotary machine differs from 1.

Command vector calculation circuitry, as recited in the appended claims, corresponds to the voltage amplitude calculation section 30g and voltage phase calculation section 30h of the above embodiments, in combination. Operating signal generating circuitry as recited in the claims corresponds for example to the continuation time calculation section 30j and the operating signal generating section 30k of the above embodiments, in combination. In the wording "a switching device corresponding to a highest phase", "a switching device corresponding to a lowest phase" or " a switching device corresponding to an intermediate phase" in the appended claims, "a switching device" corresponds for example to the pair of switching devices Sup, Sun (of the U-phase), or Svp, Svn (of the V-phase), or Swp, Swn (of the W-phase), of the above embodiments.

Other Embodiments

The present invention is not limited in scope to the above embodiments, and various modifications of these, or other embodiments, may be envisaged.

For example, the invention is not limited in application to controlling an IPMSM type of motor-generator, and would also be applicable to controlling an SPMSM (Surface Permanent Magnet Synchronous Motor) type of motor-generator or a field winding type of synchronous machine. Moreover the invention is not limited in application to a motor-generator or motor that is installed on a vehicle. Furthermore the invention is not limited in application to control of a motor-generator, but would be applicable to control of 3-phase synchronous machines in general.

What is claimed is:

1. An inverter control apparatus for application to a system comprising a 3-phase inverter having a plurality of switching devices corresponding to respective phases of the 3-phase inverter and a 3-phase rotary machine having respective phase windings electrically connected to the inverter control apparatus, the inverter control apparatus comprising a plurality of switching devices and operating signal generating circuitry which generates PWM (pulse width modulation) operating signals to control the switching devices for producing flows of AC current in the rotary machine;

wherein in each of successive processing periods, the operating signal generating circuitry generates the PWM operating signals such as to satisfy a first condition and a second condition, the first condition being that a state of a switching device corresponding to a highest phase of the 3-phase inverter is held fixed throughout the processing period, where the highest phase has a phase voltage that is highest among respective phase voltages of the three phases during the processing period, the second condition being that a switching device corresponding to a lowest phase of the 3-phase inverter undergoes a greater number of switching operations during the processing period than a switching device corresponding to an intermediate phase of the 3-phase inverter, where the lowest phase has a phase voltage that is lowest among the respective phase voltages of the three phases during the processing period, and the intermediate phase has a phase voltage that is intermediate between the respective phase voltages of the highest phase and the lowest phase during the processing period.

2. The inverter control apparatus as claimed in claim 1, comprising command vector calculation circuitry that calculates a command voltage vector in accordance with a control quantity of the rotary machine;

wherein, representing respective combinations of states of the PWM operating signals as voltage vectors of a space vector coordinate system in which the command voltage vector rotates with respect to the voltage vectors, and designating voltage vectors having a magnitude greater than zero as respective valid vectors, the operating signal generating generates the PWM operating signals such as to satisfy each of the first predetermined condition and the second predetermined condition in each of the successive processing periods, by selecting a pair of the valid vectors and determining a sequence and respective values of continuation time for which the pair of valid vectors are applied during the processing period;

and wherein the pair of valid vectors are selected as being respectively adjacent in phase to the command vector during the processing period.

3. The inverter control apparatus as claimed in claim 1, wherein during each of the processing periods, the switching device that corresponds to the lowest phase undergoes one more switching state transition than the switching device that corresponds to the intermediate phase.

4. The inverter control apparatus as claimed in claim 1, further comprising command vector calculation circuitry that calculates a command voltage vector expressing phase voltages currently required to be applied to the rotary machine, current phase calculation circuitry that calculates a phase angle of the AC currents flowing in the rotary machine, and phase difference calculation circuitry that calculates a difference between a phase angle of the command voltage vector and the phase angle of the AC currents;

wherein in each of the processing periods, the operating signal generating circuitry identifies the highest phase and the lowest phase based on the difference calculated by the phase difference calculation circuitry.

* * * * *